March 27, 1962  J. A. RENALDI ETAL  3,027,136
VALVE MECHANISM
Filed April 27, 1959
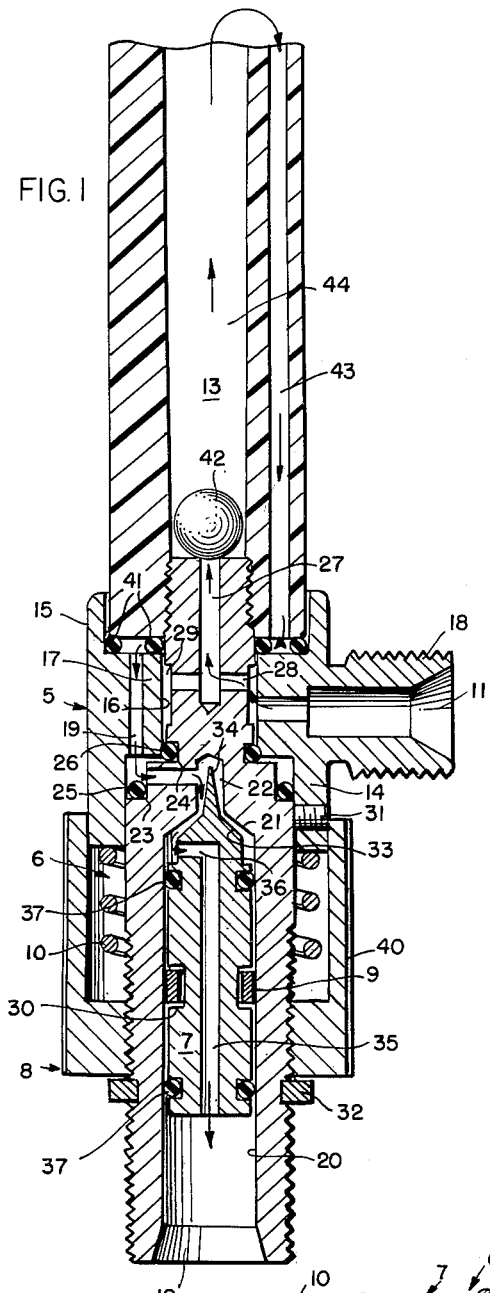
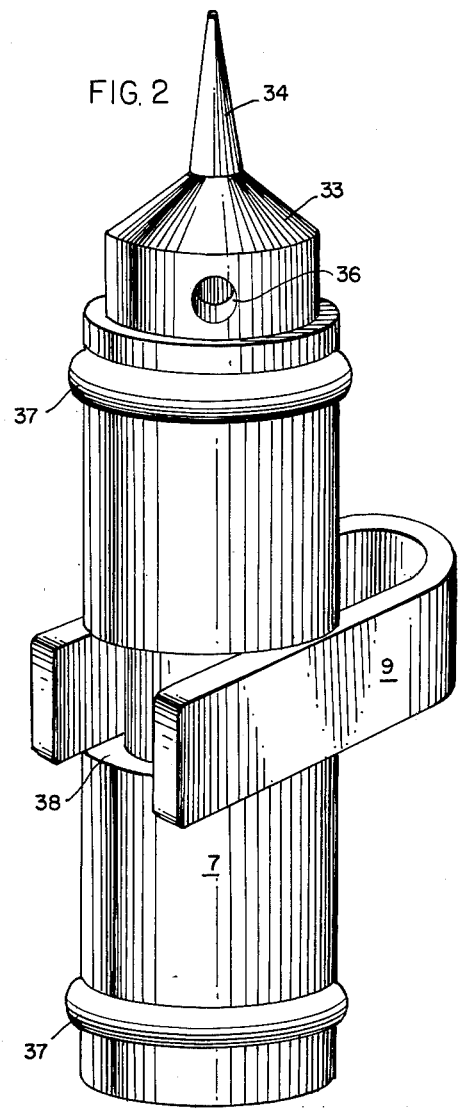
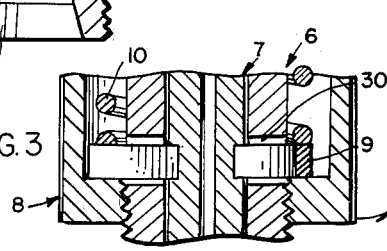
INVENTORS:
JOHN A. RENALDI
PETER A. MARKUNAS
MARTIN TERRA
BY
Rummler & Snow
ATT'YS 3,027,136
VALVE MECHANISM
John A. Renaldi, Peter A. Markunas, and Martin Terra, Chicago, Ill., assignors to J. A. Renaldi & Co., Inc., Chicago, Ill., a corporation of Illinois
Filed Apr. 27, 1959, Ser. No. 809,071
3 Claims. (Cl. 251—340)

This invention relates to valve mechanism for fluid-flow gages, especially of the type used for controlling the administration of oxygen.

The main objects of this invention are to provide an improved adjustable valve mechanism; to provide an improved adjustable valve mechanism especially adapted for use with the flow gage required for oxygen-administering apparatus; and to provide an improved valve mechanism of this kind of such simple construction as to make its manufacture economical and its use easy and precise for a very close regulation of the fluid flow through a gage wherewith the valve mechanism is associated.

In the adaptation shown in the accompanying drawings:

FIGURE 1 is a vertical, sectional view of a conventional oxygen-flow gage through which the flow is controlled by a valve mechanism constructed in accordance with this invention;

FIG. 2 is a much-enlarged, perspective view of the valve stem for this improved valve mechanism; and FIG. 3 is a vertical, sectional view of a portion of the lower end of the valve mechanism, as shown in FIG. 1, viewed from the direction of the arrow at the right of FIG. 1, with the valve-adjusting knob positioned to close the fluid flow through the gage.

The essential concept of this invention involves an externally-threaded valve-body with an axial bore terminating in a valve seat at a concentric restricted flow orifice, a valve stem slidable in the body bore and mounting a cross bar extending through and externally of the valve body for seating a spring biasing the valve stem toward its open position, and a knob rotatable on the valve body to contact the bar for shifting the valve stem against the spring to close the fluid-flow orifice.

A valve mechanism embodying the foregoing concept comprises a support element 5 from which is suspended a valve body 6 housing a slidable valve stem 7 and mounting a knob 8 axially shiftable on the valve body 6 for contacting a bar 9 on the valve stem 7 to effect the tensioning of a spring 10 for positioning the valve stem 7 to regulate the fluid flow between an inlet 11 and an outlet 12 through a flow gage 13.

The support element 5 is of cylindrical form and recessed at its ends to provide oppositely-extending annular flanges 14 and 15 and has a smaller-diameter axial bore 16 extending through the intermediate portion 17. This intermediate portion 17 is formed with the inlet 11 leading from a threaded nipple 18, and a fluid-flow channel 19 eccentrically parallel to the bore 16.

The valve body 6, also of cylindrical form is intermediately dimensioned to telescopically fit in the flange 14 and has the end beyond the flange 14 dimensioned to fit in the bore 16 of the intermediate portion 17 of the support element 5. The larger-diameter part of the valve body 6 is formed with an axial bore 20 terminating in a valve seat 21 and communicating with a right-angle restricted orifice 22 leading to the exterior of the valve body 6 within the flange 14. Adjacent the juncture of the differing-diameter parts of the valve body 6, and on opposite sides of the radial part of the orifice 22, recesses 23 and 24 are formed for seating the respective sealing rings 25 and 26. The upper reduced end of the valve body 6 is formed with axial and radial channels 27 and 28 communicating with an annular chamber 29 adjacent the support-element inlet 11.

The valve body 6 is externally threaded throughout more than half its length and near the upper end of the threads is formed with a radial opening 30 (FIG. 3) to receive the bar 9, as presently will be explained. The valve body 6 is secured in place on the support element 5 by a set screw 31 and adjacent its lower end is formed with a peripheral groove for seating a C-ring 32 to prevent unauthorized removal of the knob 8.

The valve stem 7, also cylindrical in form, is dimensioned to fit loosely in the bore 20 of the valve body 6 and is of a length much less than the axial bore 20. At its upper end, the valve stem 7 is reduced in diameter to form a tapered part 33 for contact with the valve seat 21 and a conical needle 34 extending into the orifice 22. The valve stem 7 has an axial channel 35 extending from the lower end to a radial branch 36 inwardly from the tapered end 33. Externally adjacent each end, the valve stem 7 is circumferentially grooved to receive sealing rings 37. Intermediately the valve stem 7 is formed with a circumferential recess 38 for seating the bar 9.

The bar 9, as here shown, is U-shape and seats snugly in the recess 38 with the opposite ends extending through the valve-body openings 30 and beyond the periphery of the valve body. Between this bar 9 and the end of the support element 5 is arranged the spring 10 which normally retracts the valve stem 7 to maintain open fluid flow through the valve-controlled orifice 22, subject to the positioning of the knob 8.

The knob 8 is in effect a nut with an annular flange 40 of an internal diameter slightly larger than the external diameter of the support element 5. Thus, when the knob 8 is screwed up to contact the bar 9 the flange 40 encloses and conceals the bar 9 and the spring 31. The length of this flange 40 and the positioning of the C-ring 32 is such that when the knob 8 is in its most retracted position against the C-ring 32, the upper edge of the flange 40 covers the set-screw 31 just enough to prevent access thereto effect its removal, especially if unauthorized. The C-ring would first have to be removed to permit retraction of the knob 8 sufficiently to effect a removal of the set screw 31.

The periphery of the knob 8 is longitudinally serrated to enhance its appearance and facilitate the grip of the fingers thereon for turning the knob 8 to tension the spring 10.

When this improved valve mechanism is used with oxygen-administering equipment, for which it primarily was intended, a conventional type gage 13, formed of a transparent material such as plastic is secured to the threaded, reduced end of the valve body 6 and seated on spaced concentric sealing rings 41 within the upper flange 15 of the support element 5. A conventional ball 42 seats on the channeled upper end of the valve body 6 to insure closure of the bore 27 when the equipment is not in use. The gage 13 has an eccentric longitudinal channel 43 which communicates at its upper end with the axial chamber 44 and at its lower end with the annular chamber between the sealing rings 41 which leads to the channel 19 in the support element 5.

An improved valve mechanism of this kind is used in the following manner, when interposed, as it is intended to be, between a source of oxygen supply and the mask for positioning over a patient's face.

Turning the knob 8 increases or decreases the tension of the spring 10 and thereby determines the extent to which fluid flow is permitted through the orifice 22. With any degree of flow through the orifice 22, the path of the fluid is from the inlet 11 through the chamber 29, channels 28 and 27, chamber 44, channels 43 and 19 to the orifice 22 and thence around the needle 34 and the tapered end 33 of the valve stem 7 through the channel 35 to the outlet 12.

As conditions require, turning of the knob 8 will alter the tension of the spring 29 and adjust the relationship of the needle and tapered part 33 of the valve stem 7 respectively to the orifice 22 and the valve seat 21, and consequently control the flow of oxygen to the patient.

Although but one specific embodiment of this invention is herein shown and described it will be understood that details of the construction shown may be altered or omitted without departing from the spirit of the invention as defined by the following claims.

We claim:

1. A valve mechanism comprising, a support element channeled for fluid flow therethrough from an inlet, a valve body secured to the support element and having an axial bore extending inwardly from one end and terminating in a valve seat adjacent a flow orifice communicating with the supporting-element channel, an axially-channeled valve stem slidable in the valve body bore and bore and having an end for contact with the valve seat for controlling the fluid flow through the orifice, a bar secured to the valve stem transversely thereof permanently against axial movement thereon and extending through and beyond radial openings in the valve body, a spring interposed between the support element and the bar ends for retracting the valve stem from the valve seat, and a knob mounted for axial movement on the valve body for engagement with the ends of the bar for adjusting the relative axial relationship of the valve body and valve stem for regulating the fluid flow through the orifice.

2. A valve mechanism for controlling the administration of oxygen to humans comprising, a support element recessed inwardly from opposite faces to form oppositely-extending annular flanges and having a smaller diameter bore through the intermediate portion and communicating with a radial fluid inlet, the intermediate portion of the support element being channeled to provide communication between the recessed ends of the support element eccentrically of the bore, an externally-threaded valve body dimensioned to telescopically fit with and secured to one of the end flanges of the support element and having a reduced-diameter extension fitting in and extending upwardly beyond the bore of the intermediate part of the support element and channeled to communicate with the fluid inlet, the valve body having an axial bore extending inwardly from the opposite end and terminating in a reduced-diameter valve seat adjacent a restricted flow orifice communicating with the supporting-element channel, an axially-channeled valve stem slidable in the valve-body bore and having a reduced end for contact with the valve seat for controlling fluid flow through the orifice, a bar secured to the valve stem transversely thereof permanently against axial movement thereon and extending through and beyond radial openings in the valve body, a spring interposed between the support element and the bar for normally retracting the valve stem from the valve seat, an internally-threaded knob mounted for axial movement on the valve body for engagement with the ends of the bar for altering the tension of the spring for regulating fluid flow through the orifice, a fluid-feed fitting connected to the support-element inlet, and a transparent cylindrical-shaped fluid gage secured to the end of the valve-body extension and telescopically fitting within the other end flange of the support element so as to form an annular chamber between the end of the gage and the supporting element communicating with the eccentric channel in the supporting element, the gage having an axial chamber communicating with the channel in the valve-body extension and an eccentric bore communicating with the aforesaid annular chamber.

3. A valve mechanism comprising, a support element channeled for fluid flow therethrough from an inlet, a valve body secured to the support element and having an axial bore extending inwardly from one end and terminating in a valve seat adjacent a flow orifice communicating with the supporting element channel, an axially channeled valve stem slidable in the valve body bore and having an end for contact with the valve seat for controlling fluid flow through the orifice, a U-shaped bar fitted in an annular groove of said valve stem for preventing axial movement thereon, said bar positioned transversely to said valve stem and having opposite end portions extending through and beyond radial openings in said valve body, a spring surrounding said valve body and interposed between said support element and said end portions of said bar, said spring normally retracting the valve stem from the valve seat, and a knob mounted for axial movement along the valve body for contacting said end portions of said bar to shift the valve stem against the action of the spring for regulating the fluid flow through the valve body orifice.

References Cited in the file of this patent

UNITED STATES PATENTS

| 2,126,856 | Yancey | Aug. 16, 1938 |
| 2,302,029 | Hulsmann | Nov. 17, 1942 |
| 2,302,089 | Aller | Nov. 17, 1942 |
| 2,406,941 | Brooks | Sept. 3, 1946 |
| 2,920,860 | Anderson | Jan. 12, 1960 |

FOREIGN PATENTS

| 532,081 | Italy | of 1955 |